Oct. 13, 1959 K. McILWAIN Re. 24,720

SIMULTANEOUS SEARCHING AND TRACKING SYSTEM

Original Filed April 4, 1952 3 Sheets-Sheet 1

INVENTOR.
KNOX McILWAIN

BY Lawrence B. Dodds
ATTORNEY

SIMULTANEOUS SEARCHING AND TRACKING SYSTEM

Original Filed April 4, 1952 3 Sheets-Sheet 2

*INVENTOR.*
KNOX McILWAIN

*BY* Laurence B. Dodds

ATTORNEY

SIMULTANEOUS SEARCHING AND TRACKING SYSTEM

Original Filed April 4, 1952 3 Sheets-Sheet 3

INVENTOR.
KNOX McILWAIN
BY Laurence B. Dodds
ATTORNEY

United States Patent Office

Re. 24,720
Reissued Oct. 13, 1959

24,720

SIMULTANEOUS SEARCHING AND TRACKING SYSTEM

Knox McIlwain, Paoli, Pa., assignor to Hazeltine Research, Inc., Chicago, Ill., a corporation of Illinois Original No. 2,761,132, dated August 28, 1956, Serial No. 280,561, April 4, 1952. Application for reissue August 27, 1958, Serial No. 757,891

12 Claims. (Cl. 343—17.1)

Figure 1:
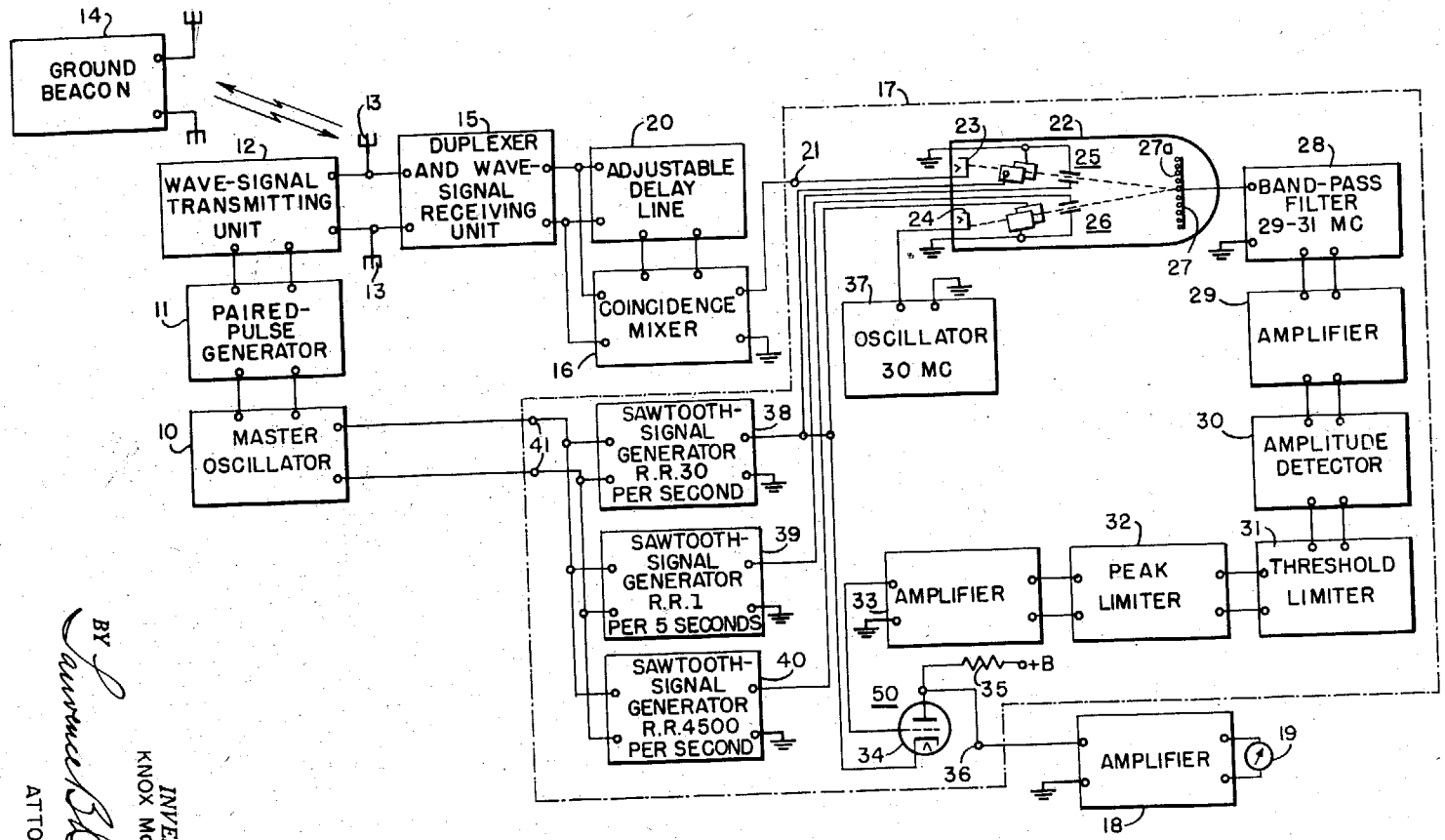

Matter enclosed in heavy brackets [ ] appears in the original patent but forms no part of this reissue specification; matter printed in italics indicates the additions made by reissue.

GENERAL

The invention is directed to simultaneous searching and tracking systems for use in radio-position locators to derive therein an effect representative only of received regularly occurring target pulses. Such systems are especially useful in distance-measuring equipment of the type described in an article entitled "Pulse-multiplex system for distance-measuring equipment (DME)," published in the Proceedings of the I.R.E. for November 1949 at pages 1236–1242, inclusive, and, for convenience, will be described in connection with such equipment.

Distance-measuring equipment is utilized at the present time in aircraft to enable a pilot to determine the distance of his craft from known ground stations or beacons. The airborne apparatus comprises a transmitter-receiver combination, conventionally designated as an interrogator-responser, for transmitting coded pulse-type challenging signals to trigger a selected beacon, and for receiving and decoding the pulse-modulated beacon reply signals to indicate the distance between the plane and the beacon. The instant of transmission of a challenging signal is a reference time for use in measuring the time of arrival of the beacon reply signals and thus the distance of the aircraft from the beacon. In an effort to free the equipment on the aircraft from the adverse effects of other challenging signals which are differently coded and are transmitted by other planes in the vicinity and from beacon replies responsive to these other signals, the airborne receiver is provided with a search feature for seeking out beacon reply signals that are coded similarly to the signals transmitted from the plane. The receiver also includes a tracking feature for selecting and tracking properly coded signals, when located by means of the search feature, continuously to determine the geographical position of the aircraft.

To accomplish searching, prior interrogator-responser apparatus includes a receiver having a modulation-signal translating channel that is normally blocked or nonconductive and a gating system for conditioning the channel to translate pulses which may be received within a sort gating interval. By varying, in a systematic manner, the time relation of the gating interval relative to the transmission of the challenging pulses, searching from minimum to maximum range is accomplished. In at least one known system the gating interval is so controlled with respect to a reference time that the gating interval is swept in discrete steps over a range of delay times representative of the range between minimum and maximum distance at a rate determined by the repetition frequency of the transmitted pulses.

It is apparent that a searching operation of the type just described is time consuming since the gating interval must remain at any one time delay for a period sufficient to permit the transmitted challenging pulses to operate the remote beacon and for the pulses transmitted by the beacon to be intercepted by the aircraft receiver. In other words, the gating interval must remain in any one position for at least a major portion of the period between successive transmissions. In more modern distance-measuring equipment, the search time has been further increased in order to have the gating interval remain at a given range for a time sufficient to intercept at least two successive responses from a reply beacon so that an additional safeguard is obtained and the aircraft receiver will not readily respond to spurious pulses that may accidentally have, at any one time, a spacing similar to the code spacing of the challenging pulses. As a result, an aircraft receiver of conventional distance-measuring equipment utilizing the types of searching systems just described may require as much as 20 seconds to search from minimum to maximum range, especially, in view of the need for having the gating interval stop at each range interval for a sufficiently long period of time to ascertain the presence or absence of a proper response signal. Because of the above-mentioned safeguard aspects of the search system, as well as the other complex features thereof, distance-measuring equipment employing such systems have tended to become bulky and complex.

This complexity and bulkiness is further increased by the fact that such equipment includes not only a search system but also a track system, as previously mentioned herein. It is desirable to minimize the bulkiness and complexity of aircraft receivers for obvious reasons, and also to utilize as little time as possible in searching for the proper signal.

It is an object of the present invention, therefore, to provide a new and improved simultaneous searching and tracking system for a radio position locator which avoids one or more of the aforementioned limitations of prior systems.

It is another object of the present invention to provide for distance-measuring equipment a new and improved tracking system which combines the above-described functions of searching and tracking in the derivation of an effect representative only of target pulses.

It is an additional object of the present invention to provide in an aircraft receiver of distance-measuring equipment a new and improved simultaneous searching and tracking system which is relatively simple in construction and relatively light in weight.

In accordance with the present invention, *in a pulse-modulation radio communication system including means for radiating periodic pulses and for receiving in response thereto desired periodic reply pulses representative of desired information but subject to receipt therewith of undesired random-occurring pulses, there is provided a simultaneous searching and tracking system for deriving an effect representative only of said desired reply pulses which comprises means for supplying the received pulses, apparatus including a multielement storage member and a first scanning means responsive to the received pulses for scanning, in timed relation with the radiated periodic pulses, the storage member in a given direction at a first rate and in a direction normal thereto at a second rate to develop thereon individual storage effects which, when occurring in a geometric pattern, are representative of a plurality of the periodic reply pulses and when disposed in a geometric random pattern are representative of the undesired pulses. The searching and tracking system of the invention also comprises a second scanning means for scanning the storage member, in a manner which is effectively nondestructive of the storage effects developed on the storage member, in such first direction at a rate comparable to the first rate and in such normal direction at a rate much greater than the first and the second rates to derive an output signal including components representative of the periodic reply pulses and of the undesired pulses, and signal-selection means responsive to the output signal for deriving an effect representative of*

*only the desired information* [there is provided in a radio-position locator, including means for radiating periodic pulses and for receiving in response thereto desired regularly occurring position-representative target pulses but subject to receive therewith undesired random occurring pulses, a searching and tracking system which derives an effect representative only of the target pulses. This system comprises means for supplying the aforesaid received pulses and also comprises apparatus including a multielement storage member, means for producing and sweeping in timed relation with the aforesaid periodic pulses a first electron beam modulated with the received pulses over the storage member along a first path at a first rate and along a path normal thereto at a second rate to develop thereon individual effects which, when occurring in a geometric group pattern are representative of each of the target pulses and when disposed in a geometric random pattern are representative of each of the undesired pulses. The apparatus just mentioned also includes means for producing and sweeping over the storage member a second electron beam, which is effectively nondestructive of the effects developed on the storage member, along said first path at a rate at least as high as the aforesaid first rate and along the aforesaid normal second path at a rate much greater than the first and second rates to derive an output signal including components representative of each of the target pulses and of each of the undesired pulses. The simultaneous searching and tracking system further includes signal-selection means responsive to the aforesaid output signal for deriving the abovementioned effect representative only of the target pulses].

For a better understanding of the present invention, together with other and further objects thereof, reference is had to the following description taken in connection with the accompanying drawings, and its scope will be pointed out in the appended claims.

Figure 2:
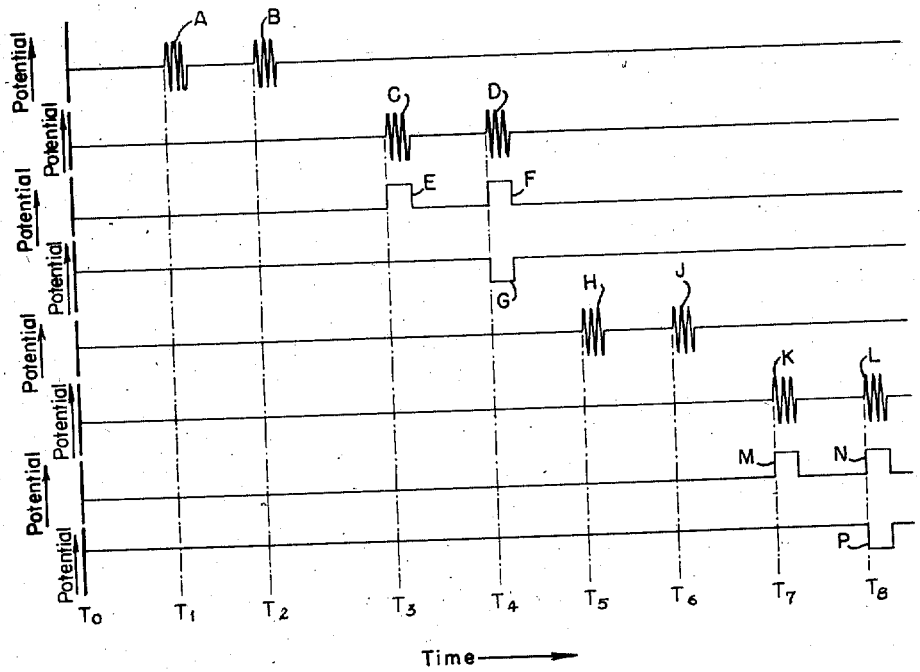

In the drawings, Fig. 1 is a schematic representation of a distance-measuring equipment embodying a simultaneous searching and tracking system for a radio-position locator in accordance with the present invention; Figs. 2 and 4 comprise graphs, and Figs. 3a and 3b comprise signal-storage patterns utilized in explaining the operation of the equipment of Fig. 1.

GENERAL DESCRIPTION OF DISTANCE-MEASURING EQUIPMENT OF FIG. 1

Referring now more particularly to Fig. 1, the distance-measuring equipment there represented, except for a beacon 14, will be assumed to be installed in an aircraft. The portion of the equipment in the aircraft represents the interrogator-responser, and in describing such it is convenient to refer to the interrogator and responser or receiver portions separately.

The interrogator comprises in cascade, in the order mentioned, a timer or master oscillator 10, a paired-pulse generator 11, and a wave-signal transmitting unit or power amplifier 12, the output circuit of which is coupled to an antenna system 13, 13. The unit 10 is a conventional timing device such as a multivibrator having a repetition rate of 30 signals per second and is arranged not only to control the period between groups of transmitted pulses but also arranged to time the operation of certain other components of the equipment, as will be described more fully hereinafter. The transmitting unit 12, in combination with the generator 11, is of a conventional type for effecting radiation of wave signals of pulse wave form having relatively short duration and a predetermined repetition rate, for example, 30 signals per second. The generator 11 is of a type which is arranged to develop modulating potentials of paired-pulse wave form under the control of the unit 10 and arranged to determine the repetition rate, spacing and duration of the challenging pulses to be transmitted. The ground reply beacon 14, including conventional equipment for intercepting the coded pulse-type wave signals radiated from the antenna system 13, 13 and for reradiating similarly coded wave signals for interception by the antenna system 13, 13, is located at some definite geographical position which may be remote from the aircraft.

The responser in the aircraft comprises a duplexer and wave-signal receiving unit 15 having an input circuit thereof coupled to the antenna system 13, 13. The duplexer portion of unit 15 may be any of a number of well-known protective devices for protecting the receiver during operating intervals in which the transmitter is sending out challenging pulses. One form of such a duplexer is described in Patent 2,415,318 entitled "Wave-Signal Receiver Arrangement" and issued February 4, 1947, to Harold A. Wheeler. The receiving portion of the unit 15 may be a superregenerator, superheterodyne or any other type of receiving section well known in the art. There are coupled to the output circuit of the unit 15 in cascade, in the order named, a coincidence mixer 16 of a conventional type, a pulse-signal selection or simultaneous searching and tracking system 17 in accordance with the present invention and to be described more fully hereinafter, an amplifier 18 and a distance-indicating meter 19. The mixer 16 includes two input circuits each of which is so biased that the mixer is rendered conductive only when signals are coincidentally applied to both input circuits. The output circuit of the unit 15 in addition to being coupled directly to the unit 16 is also coupled through an adjustable delay line 20 to the other one of the two input circuits of the coincidence mixer 16. The delay line 20 may be of a conventional type having a plurality of tapping points thereon for obtaining signals having different delay times equal to the different separation times of pair of coded pulses, the spacing between each pair of which comprises a code.

The units thus far described, except for the unit 17 to be described more fully hereinafter, may be of well-known design or construction, and for that reason, have been represented in block diagram.

EXPLANATION OF OPERATION OF DISTANCE-MEASURING EQUIPMENT OF FIG. 1

Considering briefly now the operation of the distance-measuring equipment of Fig. 1 as a whole, and assuming for the moment that unit 17 is a conventional system for searching for properly coded beacon or target signals intercepted by the unit 15 and for causing the receiver to track and develop an output signal representative only of such properly coded signals when located by the searching system, the cycle of operation of the distance-measuring equipment will be assumed to start with the steps preliminary to the transmission of a pair of challenging pulses. In explaining the operation of the equipment, it will be helpful to refer to the curves of Fig. 2.

The master oscillator 10, as previously described, may be in the form of a conventional multivibrator for developing timing pulses having a repetition rate of 30 pulses per second. At a time $T_1$ a pulse developed in the unit 10 is effective to develop in the generator 11 a pair of narrow pulses separated in time by $T_2$—$T_1$. This pair of pulses, the spacing between which is representative of a unique pulse coding of a transmitted signal for identification purposes, is effective to control a wave signal developed in the unit 12 for radiation from the antenna system 13, 13 of a pair of wave-signal pulses such as A and B of Fig. 2. The radiated pair of pulses is intercepted by the antenna system of the ground beacon 14 as pulses C and D arriving at the beacon at times $T_3$—$T_4$, respectively. The envelopes of these pulses are detected in the beacon 14, by conventional means, to develop pulses E and F. The spacing between the latter pulses is determined in the beacon 14 in a conventional manner and a pulse G representative of this spacing or coding is developed. The beacon 14 is capable, then, of developing in a conventional manner paired-pulse wave signals having a spacing related to that of the signals transmitted from the unit 12, the latter developed signals being transmitted from the unit 14 as pulses H and J at the times $T_5$—$T_6$, respectively. At times $T_7$—$T_8$, the antenna system 13, 13 intercepts the signals radiated by the beacon 14 as a pair of pulse signals K and L. In a conventional manner, the duplexer in the unit 15 permits the pulses K and L to be conducted therethrough and applied to the receiving portion of the unit 15. In this receiving portion, the envelopes of the pulses K and L are detected to form pulses M and N, respectively. The latter pulse signals are then applied both to the delay line 20 and the coincidence mixer 16. As previously described, the coincidence mixer 16 is so biased that a signal may be translated therethrough only if signals are applied simultaneously to both the input circuits thereof from the unit 15 and the unit 20. Therefore, the pulse M is not translated through unit 16, but, since the delay line 20 is assumed to be adjusted to have a time delay equal to the time between the occurrence of the pulses M and N, when the pulse N is applied to one input circuit of the coincidence mixer 16 from the unit 15, a signal representative of the pulse M and delayed in time by the unit 20 is applied to the other input circuit of the coincidence mixer 16. Thus, the units 20 and 16 are effective to recognize a properly coded paired-pulse signal intercepted by the antenna system 13, 13 and to develop a signal such as represented by curve P in the output circuit of the unit 16. The latter signal is then translated through the unit 17 and the amplifier 18 and is effective to control the indicator 19 to represent the distance of the aircraft from the beacon 14. It is apparent that one-half the difference between the time $T_8$ and the time $T_1$, with proper consideration for delays in time in the beacon 14 and in the distance-measuring equipment in the aircraft, is representative of the distance between the aircraft and the beacon. As will become more understandable hereinafter, the indicator 19 can be so controlled as to represent this distance.

The explanation just presented does not take into consideration all of the problems of determining the proper signal at the receiver on the aircraft for the purpose of ascertaining the distance of the aircraft from a beacon. Due to the fact that only a very small number of pulse codes in the form of spacing between a pair of pulses may be utilized if such equipment is to be flexible and universal, and also due to the fact that many aircraft within the signal range of the receiver on the aircraft in question will probably be utilizing similar equipment, in practice, the determination of the proper signal is accomplished not only by identifying proper coding of a pair of pulses, but also by identifying this proper coding in response to a series of interrogations by the transmitter to indicate that the pulse pairs assumed to be the proper ones successively indicate credible distance changes of the aircraft with respect to the beacon. Specifically, over a period of approximately one-half a second during which approximately 15 interrogation pulses are transmitted, the proper reply pulses should indicate approximately a constant distance between the aircraft and the beacon. It is for this reason that in prior equipment pulse pairs that appear to represent replies to the transmitted pulses are examined by the search system until at least five pulse pairs indicate approximately one distance from a beacon before the equipment is conditioned to track such pulse pairs. The need for such repetitive checking becomes apparent when it is understood that the coincidence mixer 16 may respond to any number of signals both proper and spurious as long as they appear to have the proper pulse coding. Therefore, what may be designated as a simultaneous searching and tracking system is incorporated in the distance-measuring equipment in series with the coincidence mixer 16. This system ascertains how consistently the pulses translated through the unit 16 represent proper and credible distances of the aircraft from the beacon for the purpose of tracking only those signals translated through the unit 16 which provide such credible distance information. In prior equipment this function was performed by a complex and time consuming search and track system previously described herein. The simultaneous searching and tracking system now to be described, and which is in accordance with the present invention, combines the features of searching and tracking and utilizes very few components to accomplish very rapid identification of the proper signals.

DESCRIPTION OF SEARCHING AND TRACKING SYSTEM OF FIG. 1

Referring now more particularly to the simultaneous searching and tracking system 17 of Fig. 1, this system includes a circuit for supplying regularly occurring position-representative desired pulses, for example, target pulses which represent the distance from a vehicle to a beacon or target. Such pulses have substantially equal time delays relative to recurring reference times, specifically, the times of transmission of challenging pulses from a unit such as the transmitting unit 12, the difference in time between the occurrence of a challenging pulse and the later reception of a desired pulse being representative of the distance of the vehicle from the target. Motion of the vehicle carrying the transmitter and receiver relative to the target will cause the timing of such pulses to vary slowly in a regular manner relative to the recurring times of transmission of the challenging pulses. The circuit under discussion comprises a terminal 21 coupled between the output circuit of the coincidence mixer 16 and a cathode 23 of an electron-discharge device 22 to be described more fully hereinafter. In addition to supplying the desired pulses, this circuit is subject to supply undesired other pulses representing erroneous distances of the vehicle from the target and having random time delays relative to the above-mentioned reference times.

The simultaneous searching and tracking system also comprises apparatus including a multi-element electrical storage member, specifically, the electron-discharge device 22 including cathodes 23 and 24, beam-deflection means 25 and 26 and an anode 27 having a multi-element storage surface 27a. The device 22 is of a type more fully described in an article entitled "The Graphechon—a picture storage tube" in the March 1949 issue of the RCA Review at pages 59–73, inclusive. The anode 27 conventionally comprises a plate of metal upon which is deposited a film of insulating material of minute thickness. The insulating material in combination with the metal plate effectively forms a condenser in which the metal plate is one electrode and the surface of the dielectric material remote from the metal plate is effectively the other electrode. If this condenser is charged so that a uniform potential is developed over the area of the anode and between the remote surface of the dielectric material and the metal plate, since the dielectric material has effectively infinite resistance transversely thereof, an electron beam impinging on the dielectric surface is effective independently to discharge portions of the condenser having areas substantially equal to the cross-sectional area of the beam. The amount of discharge in each area will be related to the intensity of the electron beam impinging on the area. Thus it may be said that the anode comprises a multi-element electrical storage member, specifically, a plurality of condenser elements having the metal plate as a common electrode and elemental areas on the surface of the dielectric material as the other electrodes. The device 22 may be a tube such as a type 12AP4, as represented, utilizing electrosatic beam-deflection controls or a type 12DP7 tube utilizing magnetic deflection controls, or any similar types of storage tubes.

The simultaneous searching and tracking system also comprises means which may include one of the cathodes and one of the beam-deflection means of the device 22 for applying individual ones of the pulses supplied to the terminal 21 to the elements of the multi-element storage surface, specifically, the anode 27, in a regular order or pattern for developing a group of effects representative of the desired pulses and for developing individual or random effects representative of the other pulses. Such applying means may comprise the cathode 23 and the electron-beam deflection means 25 for directing the electron beam developed by the cathode 23 on the anode 27 in a regular order, specifically, in a two-dimensional pattern having horizontal and vertical components. The deflection means 25 includes a pair of horizontal deflection electrodes coupled to the output circuit of a saw-tooth signal generator 38 and a pair of vertical deflection electrodes coupled to the output circuit of a saw-tooth signal generator 39. The generators 38 and 39 are proportioned to develop saw-tooth voltages having repetition rates, for example, of 30 signals per second and 1 signal every 5 seconds, respectively. The input circuits of the saw-tooth wave-signal generators 38 and 39 as well as a saw-tooth signal generator 40, to be described more fully hereinafter, are coupled to an output circuit of the master oscillator 10 to effect control of the initiation of the saw-tooth voltages in the generators 38–40, inclusive. Specifically, the master oscillator 10 is arranged to cause initiation of the saw-tooth voltages in the generators 38–40, inclusive, upon development of a pulse in the unit 10 which ultimately causes a wave-signal pulse to be radiated from the antenna system 13, 13. The generators 38 and 39 in cooperation with the deflection means 25 are effective to cause the electron beam emitted from the cathode 23 to trace a rectilinear pattern on the anode 27 in which the horizontal scanning rate is, for example, 30 lines per second and the vertical scanning rate is 1 vertical scansion every 5 seconds. In other words, one complete field having 150 horizontal lines is traced every 5 seconds. These scanning rates are arbitrary and may have any value limited only by the characteristics of the information to be recorded and the definition limits of the storage tube, the horizontal and vertical scanning rates described having been selected so that one horizontal line is traced by the electron beam for every challenging pulse transmitted. Expressed somewhat differently, the cathode 23 and the deflection means 25 constitute a means for producing and sweeping, in timed relation with the periodic pulses radiated by the antenna system 13, 13, a first electron beam modulated with the decoded received pulses over the anode or storage member 27 along a first or horizontal path at a first rate and along a path normal thereto at a second rate to develop an anode 27, as will be explained subsequently, individual effects or potentials which, when occurring in geometric group pattern, are representative of each of the target pulses and when disposed in a geometric random pattern are representative of each of the undesired pulses. Though the beam-deflection means 25 has been described as being arranged to effect a rectilinear tracing of the electron beam on the anode 27, it should be understood that any of a number of different two-dimensional patterns may be utilized.

The simultaneous searching and tracking system also comprises a signal-deriving apparatus which may include another of the cathodes and other of the beam-deflection means of the device 22 for deriving a signal, specifically, a potential from the effects recorded on the anode 27 for the aforesaid group of effects and a signal, specifically, a potential lower than the first-mentioned potential, for each of the individual effects. Expressed somewhat differently, this signal-deriving means comprises means for producing and sweeping over the storage member or anode 27 a second electron beam, which is effectively nondestructive of the effects developed on the storage member, along the first or horizontal path at a rate at least as high as the aforesaid first rate of 30 per second and along the second or vertical path at a rate much greater than the first rate to derive an output signal including components representative of each of the target pulses and each of the undesired pulses. This deriving means includes the cathode 24 coupled to an oscillator 37, the beam-deflection means 26, and, coupled in cascade to the output circuit of the anode 27 in the order named, a conventional band-pass filter 28, a conventional amplifier 29 and an amplitude detector 30. The oscillator 37 may, for example, develop a 30 megacycle signal while the unit 28 may have, for example, a pass band of 29–31 megacycles. The horizontal deflection circuit of the beam-deflecting means 26 is coupled to the output circuit of the generator 38, and is effective to cause a horizontal rate of scan of the electron beam emitted from the cathode 24 equal to the horizontal rate of scan developed by the deflection means 25 with respect to the beam emitted from the cathode 23. The vertical deflection portion of the deflecting means 26 is coupled to the output circuit of the generator 40, this generator having a repetition rate of, for example, 4,500 per second. The amplitude detector 30 may be a conventional peak detector in which the time constant of the load circuit thereof is of the order of the vertical scanning rate of the beam emitted from the cathode 24, for example, of the order of $1/4500$ of a second. This load circuit is so proportioned as effectively to integrate the signals translated through the units 28 and 29 over the time of trace of one vertical line traced by the electron beam emitted from the cathode 24.

The simultaneous searching and tracking system also comprises signal-selection means responsive to the output signal of detector 30 for deriving an effect representative of only target pulses from the ground beacon 14. Specifically, the signal-selection means includes, in series, a threshold limiter 31, which has an input circuit coupled to the output circuit of the detector 30, and a peak limiter 32. The threshold limiter 31 may be of a conventional type having elements so proportioned as to prevent the conduction of signals through the limiter which have amplitudes less than a predetermined amplitude, and the limiter 32 includes elements so proportioned as to limit the peak levels of the signals translated therethrough. The peak-limiting level of the unit 32 is arbitrarily selected so that the amplitudes of all signals developed in the output circuit thereof are equal. The threshold level of the limiter 31 is lower than the minimum amplitude of the selected signals developed from a group of effects developed on the anode 27 but higher than the maximum amplitude of signals developed from random effects.

The signal-selection means may also include in series, an amplifier 33 coupled to the output circuit of the limiter 32 and a peak detector 50. The detector 50 includes a vacuum tube 34 having a cathode coupled to the output circuit of the generator 38, a control electrode coupled to the output circuit of the amplifier 33, and an anode coupled through a load resistor 35 to a source of potential +B and through a terminal 36 to the amplifier 18. The searching and tracking system may also include a distance-measuring apparatus responsive to the signal output of peak detector 50 for measuring the distance of the previously mentioned vehicle from the target or beacon. More specifically, the latter apparatus includes the amplifier 18 and the distance meter 19, the former having its input circuit coupled through the terminal 36 to the detector 50. The meter 19 may be a voltmeter having a scale graduated in terms of distance.

EXPLANATION OF OPERATION OF SEARCHING AND TRACKING SYSTEM OF FIG. 1

Figure 3A:
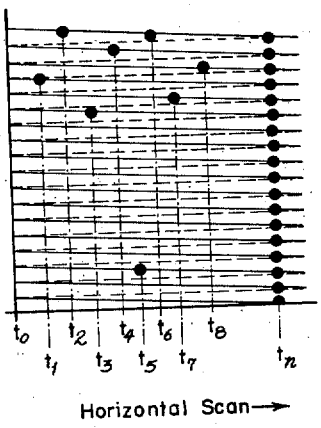
Figure 4:
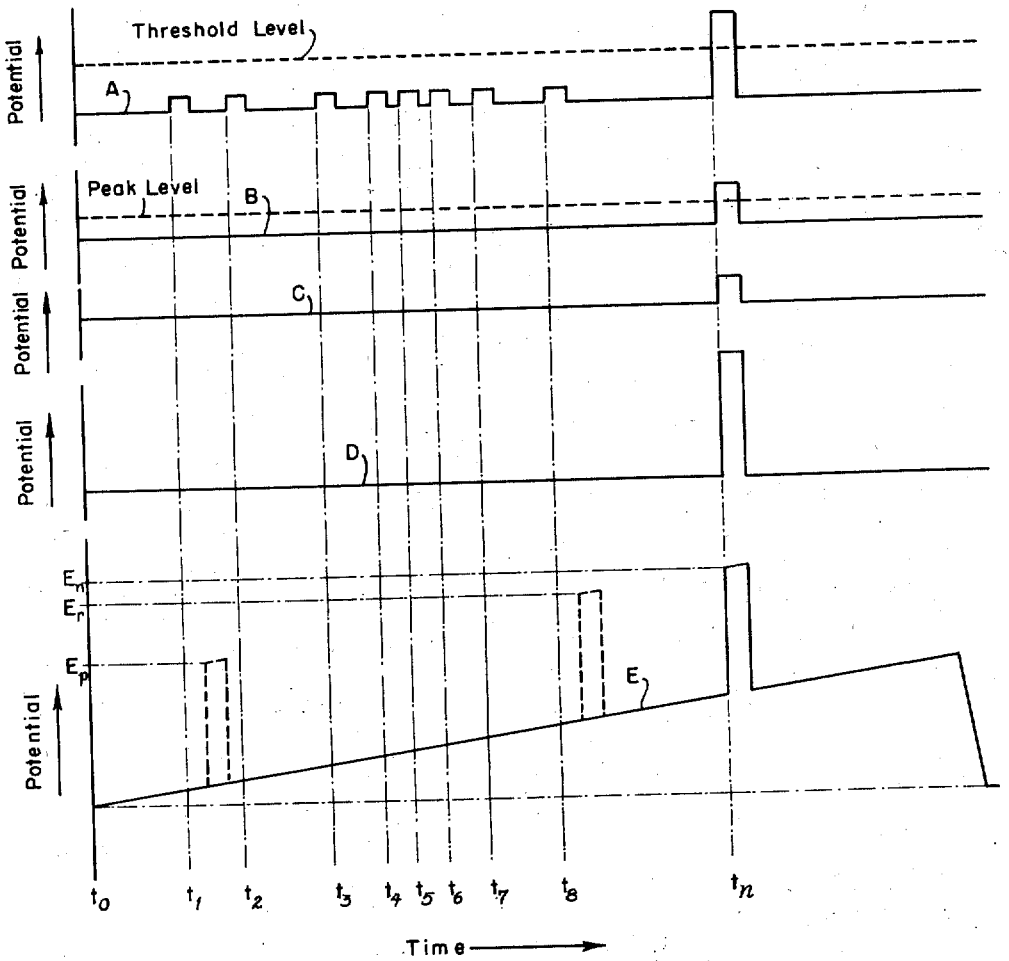

In considering the operation of the simultaneous searching and tracking system 17 of Fig. 1, it will be helpful to refer to the diagrammatic representation of the pattern traced on the anode 27 by the electron beam emitted from the cathode 23, this pattern being represented by Fig. 3a.

The pulses translated through the mixer 16 and applied to the terminal 21, as has been mentioned previously, will include desired pulses and other pulses. These pulses are applied to the cathode 23 to control the intensity of the electrons emitted therefrom. The beam-deflection means 25, by means of the saw-tooth signals applied to the vertical and horizontal control circuits thereof from the units 39 and 38, respectively, causes the electron beam emitted from the cathode 23 to initiate the trace of a horizontal line on the anode 27 as each challenging pulse is transmitted from the antenna system 13, 13, these lines being spaced vertically from each other. The intensity modulation of the beam emitted from the cathode 23 by signals applied thereto is effective to cause variations in the potentials developed across the condenser elements of the anode 27. Each line is traced horizontally across the anode 27 for some time after the radiation of a pair of challenging pulses during which time the pulses should be able to travel to a reply beacon and cause related pulses to return to the antenna system 13, 13 and be intercepted thereby. If a signal is intercepted and is translated through the unit 16, as previously described, it will effect an intensity modulation of the electron beam emitted from the cathode 23 whether the signal is a desired signal or another signal. This modulation will cause a variation in the potential of one or more of the condenser elements of the anode 27, as explained previously. Thus, referring to Fig. 3a, the signals occurring at the times $t_2$, $t_6$ and $t_n$ are recorded on the anode 27 as variations in the potentials of condenser elements thereof during the trace of the first horizontal line, where the times indicated are times elapsing between the radiation of each challenging pulse and the interception of the recorded signals. It will be assumed that of these signals, only the signal occurring at the time $t_n$ is a desired signal representing the correct distance of the aircraft from the beacon. The signals at times $t_2$ and $t_6$ are spurious signals which accidentally include proper time relationships with other signals to effect translation thereof through the unit 16. Similarly, for each of the successive horizontal lines traced by the electron beam emitted from the cathode 23, the signals occurring at times $t_1$–$t_8$, inclusive, are spurious signals, whereas all of those occurring at similar times $t_n$ are desired signals. It is apparent that the desired signals occur as a group of effects on the anode 27 having related positions in the pattern represented by Fig. 3a, specifically, being aligned substantially parallel to a vertical side of the pattern. The signals occurring at times $t_1$–$t_8$, inclusive, have unrelated positions in the pattern, appearing at random therein. As previously described, the pattern represented by Fig. 3a may comprise one field of trace of the anode 27 by the beam emitted from the cathode 23, this field being developed in approximately 5 seconds if the scanning rates previously described are employed.

Figure 3B:
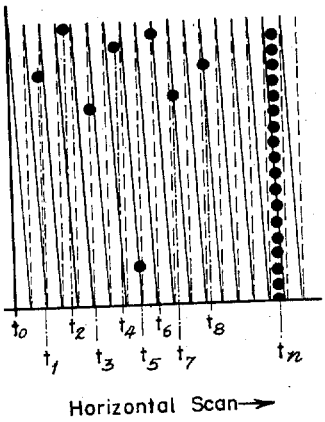

Simultaneously, with the tracing of a pattern on the anode 27 by the electron beam emitted from the cathode 23, another pattern is traced on the anode 27 by the electron beam emitted from the cathode 24. The latter overlapping pattern is represented by Fig. 3b, in which the times indicated correspond to the times mentioned with respect to the pattern of Fig. 3a. Because of the high repetition rate of the sawtooth signal applied to the vertical deflection circuit of the deflection means 26, and since the horizontal lines in each pattern are traced at the same rate, one field of scan by the electron beam emitted from the cathode 24 is effected during one horizontal line of trace of the beam emitted from the cathode 23. In other words, there are 150 vertical lines of trace made by the beam emitted from the cathode 24 while one horizontal line is being traced by the beam emitted from the cathode 23.

The intensity of the electron beam emitted from the cathode 24 is affected by the variations in potentials of the condenser elements of the anode 27 causing signals corresponding to these variations to be developed in the anode output circuit. In order to separate the signals developed by the electron beam from cathode 23 from those caused by the electron beam from cathode 24, the intensity of the beam emitted by the cathode 24 is cyclically varied at a 30 megacycle rate by the oscillator 37. Thus, effectively, the signal developed in the anode circuit by the beam emitted from the cathode 24 is a modulated 30 megacycle signal, the modulation components thereof corresponding to the potential variations of the condenser elements of the anode 27. The modulated 30 megacycle signal is translated through the band-pass filter 28, amplified in the unit 29 and the modulation components thereof are derived by the amplitude detector 30. Because of the magnitude of the time constant of the detector load circuit, the unit 30 effectively integrates the derived signals over the period of a vertical line traced by the beam emitted from the cathode 24. As a result, the undesired effects represented in Fig. 3b at times $t_1$–$t_4$, inclusive, cause relatively small amplitude signals, as represented by curve A of Fig. 4 at the corresponding times, to be developed in the output circuit of the detector 30. The desired effects occurring at the times $t_n$ and being aligned substantially along one vertical line of trace of the beam emitted from the cathode 24 cause a large amplitude signal, such as represented by curve A at time $t_n$ in Fig. 4, to be developed in the output circuit of the detector 30. It is apparent that the desired signals are distinguishable from the other signals by being signals of high amplitude relative to the amplitudes of the other signals. This difference is utilized to select the desired signals from other signals.

The signals developed in the output circuit of the detector 30, and represented by curve A of Fig. 4, are applied to the threshold limiter 31, only those exceeding the threshold limit as represented with respect to curve A of Fig. 4 being translated through the unit 31 to appear as signals represented by curve B. It is apparent that only the desired signal is thus translated. In order that all desired signals may be of equal amplitude for the purpose of providing accurate distance indication, the peaks of the signals translated through the limiter 31 are limited to the peak level represented with respect to the curve B of Fig. 4 and a signal such as represented by curve C is developed. The latter signal is applied to the amplifier 33, amplified therein to become a signal such as represented by curve D, and applied to the control electrode of the tube 34.

For the purpose of tracking the target and measuring the distance of the vehicle or aircraft from a target or beacon, the selected signal representing a desired pulse in a system of the type herein described should develop in the output circuit of the detector 50 a signal the potential of which is continuously a direct measurement of the distance of the aircraft from the beacon. To effect this result, the saw-tooth wave signal utilized to effect horizontal tracing of the electron beams in the device 22 is also applied to the cathode of the tube 34 to effect tracking of the signal representative of the desired target. As previously explained, this saw-tooth signal is initiated at the time the challenging pulses are transmitted and the trace portion thereof is developed for a period of time after such transmission. It is a characteristic of such a saw-tooth signal that the potential of the signal uniformly increases during the trace portion. As a result, if a signal representing the selected signal, and thus the desired pulse, and always having the same amplitude regardless of the amplitude of the initially intercepted pulse, is combined with such a saw-tooth signal, the potential of the saw-tooth signal at the time of such combination is a measure of the distance of the aircraft from the beacon and thus the target is effectively tracked as the distance between it and the vehicle changes. The peak detector 50 effects such a combination and causes a signal to be developed in the output circuit thereof only when signals are applied both to the cathode and control electrode thereof. Curve E of Fig. 4 represents the combination of the saw-tooth signal and the selected signal indicating that at the time $t_n$ such combination causes a relatively high potential as represented by $E_n$ to be developed indicating a relatively long distance between the aircraft and the beacon. If the desired pulses had occurred at other times, as represented by the dashed-line pulses, potentials of $E_p$ and $E_r$ would be developed indicating shorter distances between the aircraft and the beacon.

It is apparent that the tracking system just described is simple in operation and utilizes few components to effect simultaneous searching and tracking operations which provide for a distance-measuring equipment an effect representative only of desired target pulses. Additionally, by effectively integrating the reply signals with respect to time, the proper signals are so developed as to be of high amplitude with respect to other signals which might appear to have the proper coding and thus can be selected in preference to the other signals. By means of the system described herein an aircraft responser is capable of selecting the proper signals and presenting an indication of the distance of the aircraft from a known point within a period less than a second whereas prior systems require times of the order of 20 seconds.

A simultaneous searching and tracking system in accordance with the present invention has been described with reference to a specific arrangement thereof. Specifically, a known type of storage tube having the electron beams thereof trace rectilinear-type patterns at predetermined rates has been described. The patterns described herein and the rates utilized were selected for simplicity of explanation and to utilize a relatively simple design for the electrical pulse-selection system. It should be understood that many different types of patterns may be employed, that interlacing features may also be employed with such patterns, and that it is not essential in developing the desired signal in the output circuit of the amplitude detector 30 that a full field of scan by the electron beam emitted from the cathode 24 be employed. Only so much of the latter field need be employed as will permit a sufficient integration of the desired effects with respect to the random effects to facilitate separation of the desired signals from the other signals. Considered in its most generic sense, the present invention is directed to an arrangement for effecting an integration of electrical effects so that such effects occurring at equal times relative to recurring reference times are distinguishable from other effects occurring at unequal times relative to these reference times.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a radio-position locator including means for radiating periodic pulses and for receiving in response thereto desired regularly occurring position-representative target pulses but subject to receive therewith undesired random occurring pulses, a simultaneous searching and tracking system for deriving an effect representative only of said target pulses comprising: means for supplying said received pulses; apparatus including a multielement storage member, means for producing and sweeping, in timed relation with said periodic pulses, a first electron beam modulated with said received pulses over said storage member along a first path at a first rate and along a path normal thereto at a second rate to develop thereon individual effects which, when occurring in a geometric group pattern, are representative of each of said target pulses and when disposed in a geometric random pattern are representative of each of said undesired pulses, and means for producing and sweeping over said storage member a second electron beam, which is effectively nondestructive of said effects developed on said storage member, along said first path at a rate at least as high as said first rate and along said second path at a rate much greater than said first and said second rates to derive an output signal including components representative of each of said target pulses and of each of said undesired pulses; and signal-selection means responsive to said output signal for deriving said effect representative of only said target pulses.

2. In a radio-position locator including means for radiating periodic pulses and for receiving in response thereto desired regularly occurring position-representative target pulses but subject to receive therewith undesired random occurring pulses, a simultaneous searching and tracking system for deriving an effect representative only of said target pulses comprising: means for supplying said received pulses; apparatus including a multielement storage member, means for producing and sweeping, in timed relation with said periodic pulses, a first electron beam modulated with said received pulses over said storage member along a first path at a first rate and along a path normal thereto at a second rate to develop thereon individual effects which, when occurring in a geometric group pattern, are representative of each of said target pulses and when disposed in a geometric random pattern are representative of each of said undesired pulses, and means for producing and sweeping over said storage member a second electron beam, which is effectively nondestructive of said effects developed on said storage member, along said first path at a rate at least as high as said first rate and in synchronism with the sweep of said first beam at said first rate and along said second path at a rate much greater than said first and said second rates to derive an output signal including components representative of each of said target pulses and of each of said undesired pulses; and signal-selection means responsive to said output signal for deriving said effect representative of only said target pulses.

3. In a radio-position locator including means for radiating periodic pulses and for receiving in response thereto desired regularly occurring position-representative target pulses but subject to receive therewith undesired random occurring pulses, a simultaneous searching and tracking system for deriving an effect representative only of said target pulses comprising: means for supplying said received pulses; apparatus including a multielement storage member, means for producing and sweeping, in timed relation with said periodic pulses, a first electron beam modulated with said received pulses over said storage member along a first path at a first rate and along a path normal thereto at a second rate to develop thereon individual effects which, when occurring in a geometric group pattern, are representative of each of said target pulses and when disposed in a geometric random pattern are representative of each of said undesired pulses, and means including a carrier frequency oscillator for producing a second electron beam modulated at the frequency of said oscillator and for sweeping over said storage member said second beam, which is effectively nondestructive of said effects developed on said storage member, along said first path at a rate at least as high as said first rate and along said second path at a rate much greater than said first and said second rates and including in cascade with said storage member a filter, having a pass band centered on the frequency of said oscillator, and an amplitude detector having an output circuit for deriving therein an output signal including components representative of each of said target pulses and of each of said undesired pulses; and signal-selection means responsive to said output signal for deriving said effect representative of only said target pulses.

4. In a radio-position locator including means for radiating periodic pulses and for receiving in response thereto desired regularly occurring position-representative target pulses but subject to receive therewith undesired random occurring pulses, a simultaneous searching and tracking system for deriving an effect representative only of said target pulses comprising: means for supplying said received pulses; apparatus including a multielement storage member, means for producing and sweeping, in timed relation with said periodic pulses, a first electron beam modulated with said received pulses over said storage member in a first direction at a first rate and in a direction normal thereto at a second rate to develop thereon individual effects which, when occurring in a geometric group pattern, are representative of each of said target pulses and when disposed in a geometric random pattern are representative of each of said undesired pulses, and means for producing and sweeping over said storage member a second electron beam, which is effectively nondestructive of said effects developed on said storage member, in said first direction at said first rate and in synchronism with the sweep of said first beam at said first rate and in said second direction at a rate much greater than said first and second rates to derive an output signal including components representative of each of said target pulses and of each of said undesired pulses; and signal-selection means including amplitude-limiting means responsive to said output signal for deriving constant amplitude pulses representative of only said target pulses and including in cascade with said limiting means a sweep generator for producing in timed relation with said periodic pulses a sweep voltage having said constant amplitude pulses superimposed thereon and having a maximum amplitude constituting said effect representative of only said target pulses and the distance to the source of said target pulses.

5. In a radio-position locator including means for radiating periodic pulses and for receiving in response thereto desired regularly occurring position-representative target pulses but subject to receive therewith undesired random occurring pulses, a simultaneous searching and tracking system for deriving an effect representative only of said target pulses comprising: means for supplying said received pulses; apparatus including a multielement storage member, means for producing and sweeping, in timed relation with said periodic pulses, a first electron beam modulated with said received pulses over said storage member along a first path at a first rate and along a path normal thereto at a second rate to develop thereon individual effects which, when occurring in a geometric group pattern, are representative of each of said target pulses and when disposed in a geometric random pattern are representative of each of said undesired pulses, and means including a carrier-frequency oscillator for producing and sweeping a second electron beam modulated at the frequency of said oscillator and for sweeping said second beam, which is effectively nondestructive of said effects developed on said storage member, over said storage member along said first path at a rate at least as high as said first rate and along said second path at a rate much greater than said first and said second rates and including in cascade with said storage member a filter, having a pass band centered on the frequency of said oscillator, and an amplitude detector having an output circuit for deriving therein an output signal including components representative of each of said target pulses and of each of said undesired pulses; and signal-selection means including amplitude limiting means responsive to said output signal for deriving constant amplitude pulses representative of only said target pulses and including in cascade with said limiting means a sweep generator for producing in timed relation with said periodic pulses a sweep voltage having said constant amplitude pulses superimposed thereon and having a maximum amplitude constituting said effect representative of only said target pulses.

6. A radio-position locator comprising: means for radiating coded periodic pulses and for receiving in response thereto desired coded regularly occurring position-representative target pulses but subject to receive therewith undesired random occurring pulses sometimes having the code of said target pulses; means for decoding said received pulses and deriving decoded pulses therefrom; apparatus including a multielement storage member, means for producing and sweeping, in timed relation with said periodic pulses, a first electron beam modulated with said decoded pulses over said storage member along a first path at a first rate and along a path normal thereto at a second rate to develop thereon individual effects which, when occurring in a geometric group pattern, are representative of each of said target pulses and when disposed in a geometric random pattern are representative of each of said undesired pulses, and means for producing and sweeping over said storage member a second electron beam, which is effectively nondestructive of said effects developed on said storage member, along said first path at a rate at least as high as said first rate and along said second path at a rate much greater than said first and said second rates to derive an output signal including components representative of each of said target pulses and of each of said undesired pulses; and signal-selection means responsive to said output signal for deriving said effect representative of only said target pulses.

*7. In a pulse-modulation radio communication system including means for radiating periodic pulses and for receiving in response thereto desired periodic reply pulses representative of desired information but subject to receipt therewith of undesired random-occurring pulses a simultaneous searching and tracking system for deriving an effect representative only of said desired reply pulses comprising: means for supplying said received pulses; apparatus including a multielement storage member, a first scanning means responsive to said received pulses for scanning, in timed relation with said radiated periodic pulses, said storage member in a given direction at a first rate and in a direction normal thereto at a second rate to develop thereon individual storage effects which, when occurring in a geometric pattern, are representative of a plurality of said periodic reply pulses and when disposed in a geometric random pattern are representative of said undesired pulses, and a second scanning means for scanning said storage member, in a manner which is effectively nondestructive of said storage effects developed on said storage member, in said first direction at a rate comparable to said first rate and in said normal direction at a rate much greater than said first and said second rates to derive an output signal including components representative of said periodic reply pulses and of said undesired pulses; and signal-selection means responsive to said output signal for deriving an effect representative of only said desired information.*

*8. In a pulse-modulation radio communication system including means for radiating periodic pulses and for receiving in response thereto desired periodic reply pulses representative of desired information but subject to receipt therewith of undesired random-occurring pulses, a simultaneous searching and tracking system for deriving an effect representative only of said desired reply pulses comprising: means for supplying said received pulses; apparatus including a multielement storage member, a first scanning means responsive to said received pulses for scanning, in synchronism with said radiated periodic pulses, said storage member in a given direction at a*

*first rate and in a direction normal thereto at a second rate to develop thereon individual storage effects which, when occurring in a geometric pattern, are representative of a plurality of said periodic reply pulses and when disposed in a geometric random pattern are representative of said undesired pulses, and a second scanning means for scanning said storage member, in a manner which is effectively nondestructive of said storage effects developed on said storage member, in said first direction in synchronism with said first scanning means and in said normal direction at a rate much greater than said first and said second rates to derive an output signal including components representative of said periodic reply pulses and of said undesired pulses; and signal-selection means responsive to said output signal for deriving an effect representative of only said desired information.*

*9. In a pulse-modulation radio communication system including means for radiating periodic pulses and for receiving in response thereto desired periodic reply pulses representative of desired information but subject to receipt therewith of undesired random-occurring pulses, a simultaneous searching and tracking system for deriving an effect representative only of said desired reply pulses comprising: means for supplying said received pulses; apparatus including a multielement storage member; a first scanning means responsive to said received pulses for scanning, in timed relation with said radiated periodic pulses, said storage member in a given direction at a first rate and in a direction normal thereto at a second rate to develop thereon individual storage effects which, when occurring in a geometric pattern, are representative of a plurality of said periodic reply pulses and when disposed in a geometric random pattern are representative of said undesired pulses, and a second scanning means for scanning said storage member, in a manner which is effectively nondestructive of said storage effects developed on said storage member, in said first direction at a rate comparable to said first rate and in said normal direction at a rate much greater than said first and said second rates to derive an output signal including large-amplitude components representative of said periodic reply pulses and small-amplitude components representative of said undesired pulses; and amplitude-selective means responsive to said output signal for deriving an effect representative of only said desired information.*

*10. In a pulse-modulation radio communication system including means for radiating periodic pulses and for receiving in response thereto desired periodic reply pulses the timing of which is representative of desired information but subject to receipt therewith of undesired random-occurring pulses, a simultaneous searching and tracking system for deriving an effect representative only of said desired reply pulses comprising: means for supplying said received pulses; apparatus including a multielement storage member, a first scanning means responsive to said received pulses for scanning, in timed relation with said radiated periodic pulses, said storage member in a given direction at a first rate and in a direction normal thereto at a second rate to develop thereon individual storage effects which, when occurring in a geometric pattern, are representative of a plurality of said periodic reply pulses and when disposed in a geometric random pattern are representative of said undesired pulses, and a second scanning means for scanning said storage member, in a manner which is effectively nondestructive of said storage effects developed on said storage member, in said first direction at a rate comparable to said first rate and in said normal direction at a rate much greater than said first and said second rates to derive an output signal including large-amplitude components representative of said periodic reply pulses and small-amplitude components representative of said undesired pulses; amplitude-selective means responsive to said output signal for deriving pulses corresponding in time to said large-amplitude components; and means responsive to the timing of said derived pulses for deriving an effect representative of said desired information.*

*11. In a pulse-modulation radio communication system including means for radiating periodic pulse groups and for receiving in response thereto desired periodic reply pulse groups representative of desired information but subject to receipt therewith of undesired random-occurring similar pulse groups, a simultaneous searching and tracking system for deriving an effect representative only of said desired reply pulse groups comprising: means responsive to the receipt of each of said pulse groups for deriving a signal; apparatus including a multielement storage member, a first scanning means responsive to said derived signal for scanning, in timed relation with said periodic pulse groups, said storage member in a given direction at a first rate and in a direction normal thereto at a second rate to develop thereon individual storage effects which, when occurring in a geometric group pattern, are representative of a plurality of said reply pulse groups and when disposed in a geometric random pattern are representative of said undesired pulse groups, and a second scanning means for scanning said storage member, in a manner which is effectively nondestructive of said storage effects developed on said storage member, in said first direction at a rate comparable to said first rate and in said normal direction at a rate much greater than said first and said second rates to derive an output signal including components representative of said reply pulse groups and of said undesired pulse groups; and signal-selection means responsive to said output signal for deriving an effect representative of only said desired information.*

*12. A pulse-modulation radio communication system comprising: means for radiating periodic pulses and for receiving in response thereto desired periodic reply pulses representative of desired information but subject to receipt therewith of undesired random-occurring pulses; apparatus including a multielement storage member, a first scanning means responsive to said received pulses for scanning, in timed relation with said radiated periodic pulses, said storage member in a given direction at a first rate and in a direction normal thereto at a second rate to develop thereon individual storage effects which, when occurring in a geometric pattern, are representative of a plurality of said periodic reply pulses and when disposed in a geometric random pattern are representative of said undesired pulses, a second scanning means for scanning said storage member, in a manner which is effectively nondestructive of said storage effects developed on said storage member, in said first direction at a rate comparable to said first rate and in said normal direction at a rate much greater than said first and said second rates to derive an output signal including components representative of said periodic reply pulses and of said undesired pulses; and signal-selection means responsive to said output signal for deriving an effect representative of only said desired information.*

References Cited in the file of this patent
or the original patent

UNITED STATES PATENTS

| | | |
|---|---|---|
| 2,250,708 | Herz | July 29, 1941 |
| 2,421,785 | Hathaway | June 10, 1947 |
| 2,422,295 | Eaton | June 17, 1947 |
| 2,427,366 | Mozley | Sept. 16, 1947 |
| 2,430,038 | Wertz | Nov. 4, 1947 |
| 2,524,295 | Mesner | Oct. 3, 1950 |
| 2,524,296 | Mesner | Oct. 3, 1950 |
| 2,524,779 | Dodington | Oct. 10, 1950 |
| 2,524,837 | Russell et al. | Oct. 10, 1950 |
| 2,549,072 | Epstein | Apr. 17, 1951 |
| 2,568,265 | Alvarez | Sept. 18, 1951 |
| 2,671,895 | Perkins | Mar. 9, 1954 |